United States Patent [19]

Courtenay et al.

[11] 4,048,134

[45] Sept. 13, 1977

[54] REFRACTORY HEAT-INSULATING MATERIALS

[75] Inventors: John Henry Courtenay; Martin Bernard Peter Wardell, both of Birmingham, England

[73] Assignee: Foseco Trading A.G., Chur, Switzerland

[21] Appl. No.: 655,372

[22] Filed: Feb. 5, 1976

[30] Foreign Application Priority Data

Feb. 10, 1975 United Kingdom ............... 5636/75

[51] Int. Cl.$^2$ ............................................. C08K 3/22
[52] U.S. Cl. ........................................ 260/38; 106/58; 260/39 R
[58] Field of Search ............... 260/38, 39 R; 106/58

[56] References Cited

U.S. PATENT DOCUMENTS

| | | | |
|---|---|---|---|
| 1,926,094 | 9/1933 | Goldsmidt et al. | 106/58 X |
| 3,732,177 | 5/1973 | Tisdale et al. | 260/38 X |
| 3,804,701 | 4/1974 | Bognor | 260/38 X |

*Primary Examiner*—Sandra M. Person
*Attorney, Agent, or Firm*—Cushman, Darby & Cushman

[57] ABSTRACT

Lining slabs for prolonged contact with molten metals, e.g. for use in tundishes, are made from a refractory heat-insulating composition comprising by weight:
  0 to 1% bentonite clay
  0 to 4% cellulosic fibre
  4 to 8% synthetic resin binder
  0 to 7% refractory fibrous material, and
  balance to 100% a mixture of particulate magnesia and particulate olivine, the weight ratio of magnesia : olivine being from 1:10 to 4:1 and the composition containing at least 1% by weight of fibrous material.

9 Claims, No Drawings

REFRACTORY HEAT-INSULATING MATERIALS

This invention relates to refractory heat-insulating materials.

In certain applications in the handling of molten metals there is a need for materials which combine long period refractoriness and resistance to attack by molten metal with high heat insulation capacity. Such materials should desirably be inexpensive so that they may be scrapped after one use, and they should leave no deleterious residues after use.

Many refractory heat-insulating materials have been proposed which strike a compromise between these various factors, but in certain use conditions, notably in the lining of tundishes used in continuous casting, no very satisfactory materials have heretofore been developed. A particular disadvantage from which many earlier proposed types suffered was the inclusion of either or both of asbestos and silica: this gave rise to a health hazard to personnel involved with the removal and disposal of spent refractory, which tended to generate much dust.

We have now found a narrow range of compositions suitable for the purpose but which do not suffer from the disadvantages just noted.

According to the present invention there is provided a refractory heat-insulating composition comprising, by weight:
- 0 to 1% bentonite clay
- 0 to 4% cellulosic fibre
- 4 to 8% synthetic resin binder
- 0 to 7% refractory fibrous material, and
- balance to 100% a mixture of particulate magnesia and particulate olivine, the weight ratio of magnesia : olivine being from 1:10 to 4:1 and the composition containing at least 1% by weight of fibrous material.

If the magnesia : olivine ratio is too low, the resistance to attack of the composition is low, and slabs made from the composition would not be usable in conditions of prolonged high temperature and slag attack. If the magnesia : olivine ratio is above 4:1, the heat-insulating ability of the composition is adversely affected, and the cost of the material rises to uneconomic levels. The weight of slabs of such a composition would also rise to a level where slabs of conventional size, e.g. for lining continuous casting tundishes, would make handling difficult, especially for one man.

The magnesia used is conveniently calcined or dead-burnt magnesite available as a standard refractory raw material.

Preferably the refractory fibrous material is not asbestos. Aluminosilicate, calcium silicate, slag wool, rock wool and mineral wool or mixtures thereof can be used. Preferably the composition comprises 5 to 7% by weight refractory fibrous material.

The synthetic resin binder may be chosen from a wide range of resin binders known for use in the refractory materials art, e.g. phenol- and urea-formaldehyde resins, melamine-formaldehyde resins, furane resins. A particularly preferred binder is a mixture of urea- and phenol-formaldehyde resins.

The magnesia : olivine weight ratio is preferably 4:6 to 6:4. Iron oxide (FeO) will be present in the composition as a constituent of the olivine and may also be present in the form of impurity in the magnesia when the magnesia is derived from magnesite. As FeO tends to increase slagging and to reduce the refractoriness of the composition it is preferred that the total FeO in the composition is less than 5% by weight.

A particularly preferred class of compositions comprises the following ingredients in the following proportions by weight:
- magnesia: 42 – 45%
- olivine: 40 – 45%
- slag wool: 5 – 7%
- phenol-formaldehyde resin: about 3.5%
- urea-formaldehyde resin: about 2.5%
- bentonite: 0 – 1%
- paper pulp: 0 – 3%

Shaped articles according to the invention may be made by any of the conventional processes for fabricating refractory fibre-containing compositions. Preferred are methods involving forming a slurry of the ingredients, dewatering a portion of slurry in a mould to leave a damp self-supporting article and thereafter drying the article.

The following specific examples will serve to illustrate the invention:

EXAMPLE 1

A composition was made up of (by weight):
- calcium silicate fibre: 5.0%
- P-F resin: 3.5%
- U-F resin: 2.5%
- paper: 3.0%
- olivine (less than 355 microns): 43.0%
- dead-burnt magnesite (less than 250 microns): 43.0% and fabricated to refractory boards to line a casting tundish. Steel of composition 1.6% C, 1.4% Mn and 0.26% Si was passed at a metal temperature in the tundish of 1540° C for a 1½ hours casting cycle. No erosion of the boards took place.

EXAMPLE 2

Boards were made as in Example 1 of a composition (by weight):
- calcium silicate fibre: 5.0%
- P-F resin: 3.5%
- U-F resin: 2.5%
- paper: 3.0%
- olivine (less than 150 microns): 26.0%
- dead-burnt magnesite (less than 250 microns): 60.0%

Steel of 0.18% C, 0.60% Mn and 0.30% Si was passed through the tundish at a metal temperature in the tundish of 1545° C.

No erosion of the boards took place over a 3½ hours casting cycle.

EXAMPLE 3

A set of refractory slabs was made up from the following composition (by weight):
- calcium silicate fibre: 2%
- phenol-formaldehyde resin: 6%
- paper: 3%
- magnesia and olivine
- balance The slabs were then tested by immersing them in a high frequency induction furnace containing molten steel at 1650° C covered by a slag containing 45% silica. The slabs were held partly immersed in the steel and part in contact with the slag for 5 minutes. The slabs were then removed and visually inspected for resistance to the attack from steel and slag, and awarded a score from 0 (no resistance to attack) to 10 (slab unchanged. 5 is considered adequate resistance for most uses of such slabs. The results obtained using various olivine/magnesite mixtures, were tabulated as follows:

| Weight Ratio of magnesia: olivine | | | Resistance to Steel Attack | Resistance to Slag Attack |
| --- | --- | --- | --- | --- |
| olivine | | all | 0 | 0 |
| 1 | : | 12 | 4 | 5 |
| 1 | : | 10 | 5 | 6 |
| 1 | : | 1 | 7 | 7 |
| 3 | : | 1 | 8 | 8 |
| 4 | : | 1 | 9 | 9 |

It is observed that adequate resistance is only obtained when the magnesia to olivine ratio falls within the range of 1:10 to 4:1.

We claim as our invention:

1. A refractory heat-insulating composition consisting essentially of, by weight:
   1 to 11% fibrous material 4 to 8% synthetic resin binder and
   80 to 95% a mixture of particulate magnesia and particulate olivine,
the weight ratio of magnesia: olivine being from 1:10 to 4:1 and the composition containing not more than 4% by weight of cellulosic fibrous material and not more than 7% by weight refractory fibrous material.

2. A refractory heat-insulating material according to claim 1, wherein the magnesia is dead-burnt magnesite.

3. A refractory heat-insulating composition according to claim 1, wherein the fibrous material is selected from the class consisting of aluminosilicate fibre, calcium silicate fibre, mineral wool, rock wool and slag wool.

4. A refractory heat-insulating composition according to claim 1 and containing refractory fibrous material in a proportion of 5 to 7% by weight of the composition.

5. A refractory heat-insulating composition according to claim 1, wherein the resin binder is selected from the class consisting of phenol- and urea-formaldehyde resins and mixtures of phenol- and urea-formaldehyde resins.

6. A refractory heat-insulating composition according to claim 1, wherein the weight ratio of magnesia : olivine is 4:6 to 6:4.

7. A refractory heat-insulating composition according to claim 1 and which contains less than 5% by weight FeO.

8. A composition according to claim 1 and comprising the following ingredients in the following proportions, by weight:
   magnesia: 42 – 45%
   olivine: 40 – 45%
   slag wool: 5 – 7%
   phenol-formaldehyde resin: about 3.5%
   urea-formaldehyde resin: about 2.5%.

9. A tundish lining slab formed of a composition according to claim 1.

* * * * *